(12) United States Patent
Harris et al.

(10) Patent No.: US 7,304,239 B1
(45) Date of Patent: Dec. 4, 2007

(54) WIRE ROUTING DEVICE FOR A VEHICLE

(75) Inventors: Jerry M. Harris, New Baltimore, MI (US); Kevin G. Mets, Washington, MI (US); John W. Macaulay, Royal Oak, MI (US); David M. Stephen, Pinckney, MI (US); Constantine J. Nicolopoulos, Columbus, MI (US); Sharyl L. Loose, East Pointe, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/458,705

(22) Filed: Jul. 20, 2006

(51) Int. Cl.
*H02G 3/04* (2006.01)

(52) U.S. Cl. ............... 174/72 A; 174/71 R; 174/72 C; 174/135; 296/146.7

(58) Field of Classification Search ............ 174/70 A, 174/72 A, 71 R, 72 C, 72 R, 135, 54, 61, 174/64; 296/146.7
See application file for complete search history.

(56) References Cited

U.S. PATENT DOCUMENTS

| | | | |
|---|---|---|---|
| 6,142,556 A * | 11/2000 | Tanaka et al. ............ | 296/146.7 |
| 6,515,229 B2 * | 2/2003 | Aoki et al. ............... | 174/72 A |
| 6,534,713 B2 * | 3/2003 | Kafer ........................ | 174/72 A |
| 6,903,274 B2 * | 6/2005 | Aoki et al. ............... | 174/72 A |
| 2002/0068486 A1 * | 6/2002 | Kafer ........................ | 439/625 |

* cited by examiner

*Primary Examiner*—Dhiru R. Patel
(74) *Attorney, Agent, or Firm*—Ralph E. Smith

(57) ABSTRACT

An exemplary wire routing device routes a wire between a vehicle body and a vehicle door movably mounted to the vehicle body. The device includes a flexible restraint having an attachment portion arranged to be attached to the vehicle body and another attachment portion arranged to be attached to the vehicle door. The device also includes a flexible conduit carried by the flexible restraint and arranged to carry the wire therethrough.

19 Claims, 3 Drawing Sheets

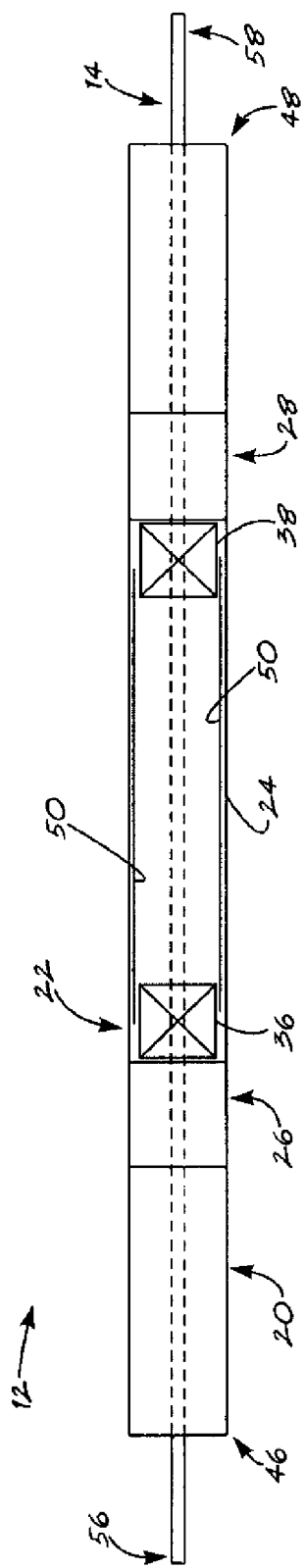
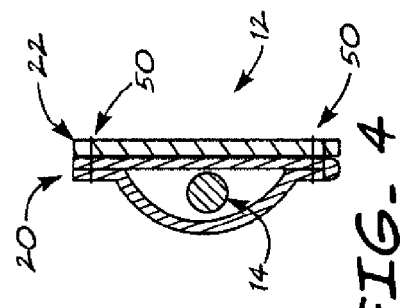
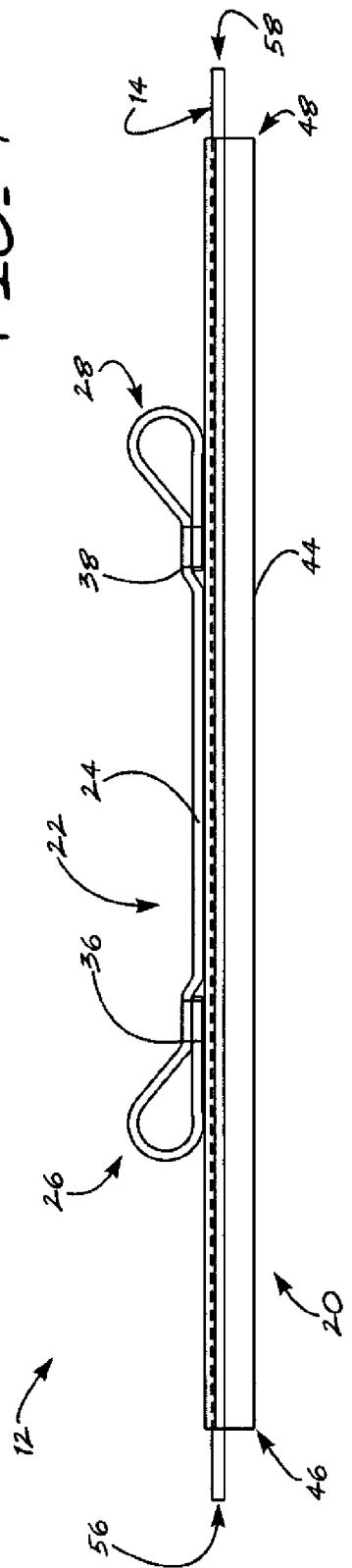

WIRE ROUTING DEVICE FOR A VEHICLE

FIELD OF THE INVENTION

This invention relates generally to vehicles and, more particularly, to a wire routing device for a vehicle.

BACKGROUND OF THE INVENTION

Various wire routing devices are known and used for routing wires in a vehicle from a vehicle body to a vehicle door. Such body-to-door wire routing typically includes a tube-through-grommet arrangement wherein a rubber conduit carries a wire and extends through and between grommets inserted in corresponding aligned holes in the body and adjacent door. The wire has one end connected at the body and another end connected at the door, with slack in the wire to allow the door to open. A fixed end of the rubber conduit is clamped to the body, and a free end extends loosely inside the door. Accordingly, the free end can flex and move relative to the door to allow the door to be opened and closed.

SUMMARY OF THE INVENTION

An exemplary implementation of a wire routing device is usable in a vehicle to route a wire between a vehicle body and vehicle door movably mounted to the vehicle body. The device includes a flexible restraint having a first attachment portion arranged to be attached to the vehicle body and a second attachment portion arranged to be attached to the vehicle door. The device also includes a flexible conduit carried by the flexible restraint and arranged to carry the wire.

An exemplary implementation of a vehicle includes a vehicle body, a vehicle door movably mounted to the body, an electrical wire extending between the body and the door, and a wire routing device secured to the body and the door. The wire routing device is used to route the electrical wire between the body and the door. The device includes a flexible restraint having one end arranged to be attached to the body and another end arranged to be attached to the door. The device also includes a flexible conduit carried by the flexible restraint and arranged to carry the electrical wire.

BRIEF DESCRIPTION OF THE DRAWINGS

The following detailed description of preferred embodiments, will be made with reference to the accompanying drawings in which:

FIG. 2 is side view of the wire routing device of FIG. 1;

FIG. 3 is a top view of the wire routing device of FIG. 2;

FIG. 4 is a cross-sectional view of the wire routing device taken along line 4-4 of FIG. 1.

DETAILED DESCRIPTION OF PREFERRED EMBODIMENTS

Figure 1:
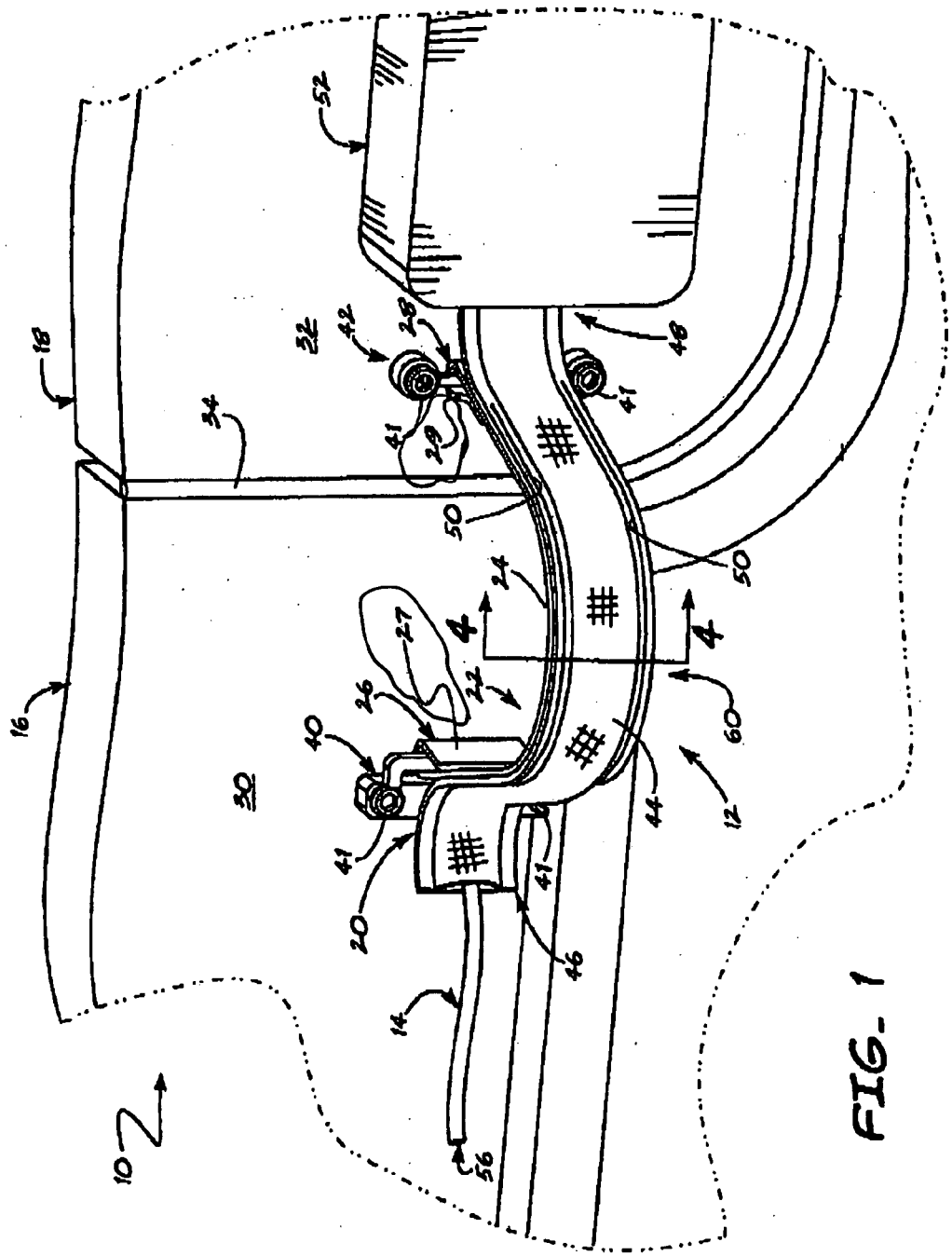
FIG. 1 is a perspective view of a wire routing device for a vehicle that is attached between a portion of a vehicle body and a closed vehicle door.

Referring in more detail to the drawings, FIG. 1 illustrates a vehicle 10 including a wire routing device 12 to route a wire 14 between a vehicle body 16 and a vehicle door 18 movably mounted to the body 16. The vehicle door 18 can be a passenger door as shown, or a hood, decklid, sliding door, liftgate, tailgate, or any other vehicle door. As used herein, the phrase passenger door includes a front right hand door, rear passenger doors, and a front left hand or driver door. The wire routing device 12 preferably includes a conduit 20 to carry the wire 14 from the body 16 to the door 18, and a restraint 22 to carry and restrain the conduit 20. The wire routing device 12 may stabilize and protect the wire 14. As will be discussed further herein below with respect to FIG. 5, the wire routing device 12 may also restrain the door 18 from opening too far with respect to the body 16.

Referring to FIGS. 1 through 4, the restraint 22 includes a central section 24 and attachment portions attached to respective portions of the vehicle 10. For example, the restraint 22 can include ends 26, 28 arranged to be secured to vehicle body 16 and vehicle door 18 respectively. More specifically, a first end 26 of the restraint 22 may include a first attachment portion 27 that is arranged for attachment to an interior surface 30 of the vehicle body 16, and an opposite, second end 28 may include a second attachment portion 29 that is arranged for attachment to an interior surface 32 of the vehicle door 18. Accordingly, the wire routing device 12 can be positioned inboard with respect to a door weather strip 34, thereby obviating use of any seals or grommet-like elements in the wire routing device 12 itself.

The restraint 22 of the wire routing device 12 can be attached to the vehicle 10 in any suitable fashion. The restraints opposite ends 26, 28 may be looped for bracketed attachment to the vehicle 10. Accordingly, the restraint 22 is preferably constructed as a flexible component, preferably from a strip of material. For example, the strip of material could be a strip of nylon or canvas fabric or any other suitable flexible material. The ends of a fabric strip used to construct the restraint 22 may be folded onto themselves so as to define opposed closed loops constituting the opposite ends 26, 28. Then, the folded opposite ends of the fabric strip are preferably sewed using boxed X-stitches 36, 38 as shown in FIG. 2. Thereafter, as shown in FIG. 1, the looped first end 26 can be secured to the vehicle body 16 by a body bracket 40, which is fastened to the vehicle body 16 by screws 41. The body bracket 40 can be unitary and can have a free upper end as shown, wherein the looped first end 26 of the restraint 22 can be slipped over the free upper end for easy assembly and disassembly. Similarly, the looped second end 38 can be secured to the vehicle door 18 by a door bracket 42, which is fastened to the vehicle door by screws 41. The door bracket 40 can be unitary and can also have a free upper end, wherein the looped second end 28 of the restraint 22 can be slipped over the free end for easy assembly and disassembly.

Referring to FIGS. 2 through 4, the conduit 20 of the wire routing device 12 is preferably a flexible component preferably constructed from a sleeve or sock of material like nylon or canvas fabric or the like. The conduit 20 can be constructed in any suitable fashion and, according to one example, a relatively wide strip of material can be folded onto itself lengthwise and a resultant longitudinal seam sewed to create an open-ended hollow body. The conduit 20 can include a central section 44, may extend beyond the looped ends 26, 28 of the restraint 22, and terminate in ends 46, 48, which are preferably open.

The conduit 20 may be carried by the restraint 22 in any suitable fashion. For example, the conduit 20 can be carried by or attached to the restraint 22 such that the conduit 20 is adhered, fastened such as with rivets or the like, or sewn, to the restraint 22. As shown, the conduit 20 is secured to the restraint 22 wherein edges of the conduit 20 and restraint 22 are sewn together with edge stitching 50. Preferably, the edge stitching 50 longitudinally starts at a point just outside and aligned with the middle of one boxed X-stitch 36, and extends lengthwise along the wire routing device 12 to a point approximately just outside and aligned with the middle of the other boxed X-stitch 38. The edge stitching 50 preferably does not enter the looped ends 26, 28 of the restraint 22. In another implementation, the conduit 20 could be carried by the restraint 22 by being integrated with it. In other words, the conduit 20 could be defined by a strip of material sewed along its edges to corresponding edges of the restraint 22.

Referring to FIG. 1, a first end 46 of the conduit 20 can be arranged for receiving the wire 14 therein from the vehicle body 16, and an opposite, second end 48 of the conduit 20 can be arranged for transmitting the wire 14 therefrom to the vehicle door 18. In the implementation shown in FIG. 1, the second end 48 extends into a vehicle door interior trim panel 52, which is carried by the door 18.

The wire 12 can be any suitable electrical wire(s) or the like. For example, the wire 12 can be a single insulated wire, a ribbon cable, or a wiring harness or a portion thereof. The wire 12 can also be any other article of any kind for conveying electrical power, electrical or electronic control signals, or the like, from one location to another. For example, the wire 12 may provide power and control signals for power door locks, power door windows, power door mirrors, power seats, or any other vehicle features. Preferably, the wire 12 is a plurality of independent insulated wires carried by an external sheath. The wire 12 is connected at a body end 56 thereof to a respective portion of the vehicle body 16 such as a wiring harness or the like by any suitable connector (not shown). Similarly, the wire 12 is connected at a door end 58 thereof to a respective portion of the vehicle door 18 such as by any suitable connector or connectors (not shown). Preferably, the body end 56 of the wire 12 is equipped with a quick-disconnect type of electrical connector to enable the wire 12 to be quickly and easily disconnected to allow the door 18 to be removed from the vehicle body 16.

As shown in FIG. 1, the door 18 is closed with respect to the body 16. Accordingly, the wire routing device 12 includes slack between its ends and a central portion 60 thereof is bent. The slack is due to the length between the ends 26, 28 of the restraint 22 being greater than the distance between the brackets 40, 42 when door is closed. The slack could take any form, shape, arrangement (arcuate bend, accordion fold, etc.). Although other arrangements are possible in this implementation, the brackets 40, 42 are oriented in a generally vertical direction, as shown, and the width of the restraint 22 is oriented generally vertically, as shown. Accordingly, the wire routing device 12 may be secured to the door 18 and to the body 16 so as to project in a generally horizontal direction into the interior of the vehicle 10 when the vehicle door 18 is closed with respect to the vehicle body 16. Preferably, no portion of the wire routing device 12 is located outboard of the weather strip 34 or pinched between the door 18 and the body 16. Finally, the first end 46 of the conduit 20 and the first end 56 of the wire 12 are slack.

Figure 5:
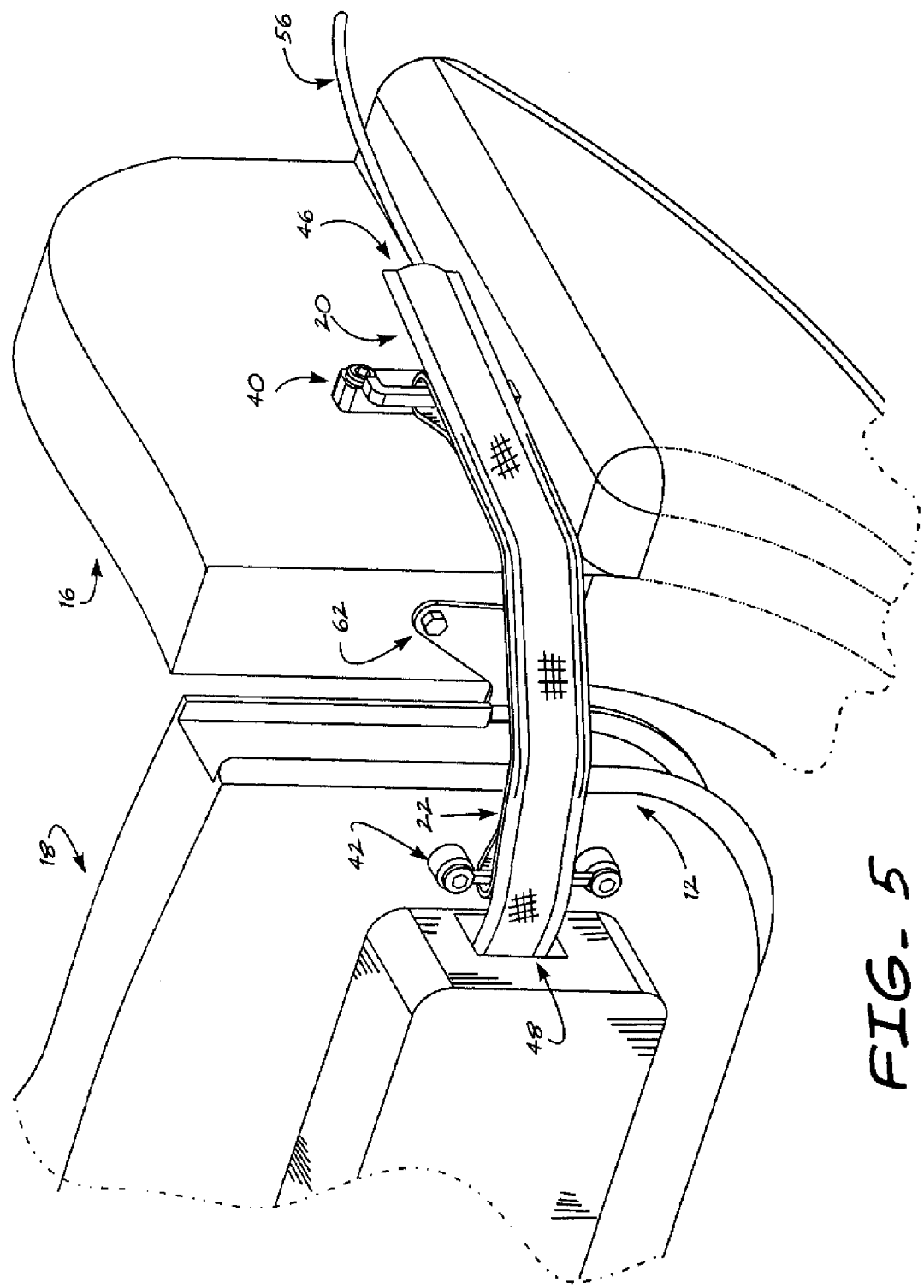
FIG. 5 is a perspective view of the wire routing device attached between another portion of the vehicle body and an open door.

In FIG. 5, the wire routing device 12 is shown in an extended state, compared to its state shown in FIG. 1. In other words, the wire routing device 12 is movable from its bent or collapsed state of FIG. 1, to its extended state in FIG. 5. This is because the opening of the door increases the distance between the brackets 40, 42 to take up the slack in the restraint 22. The wire routing device 12 is positioned inboard of and between another portion of the vehicle body 16 and a driver door 18' movably mounted to the body 16 and shown in a fully open position. The wire routing device 12 is positioned inboard with respect to a pivot point of a door hinge 62 of the vehicle body 16. As shown, ends 46, 48 of the conduit 20 and the first end 56 of the wire 14 are slack, even though the restraint is not 22. The restraint 22 is no longer slack or collapsed because the action of opening the door 18' has fully extended the restraint 22, thereby making it taut between the brackets 40, 42. Accordingly, in this implementation, the restraint 22 of the wire routing device 12 bears a tension load when the door 18' is fully opened, thereby protecting the conduit 20 from being hyperextended or otherwise damaged. The restraint 22 can also prevent the door 18' from opening too far. In other words, in addition to acting as a support and restraint for the conduit 20, the restraint 22 can also act as a door check strap in restraining the door 18'.

Finally, the wire routing device 12 may be detachable to allow the door 18 to be removed with respect to the vehicle body 16 after the wire 14 and wire routing device 12 are disconnected from respective portions of the vehicle body 16. Accordingly, the wire 14 may be easily and quickly disconnected as discussed above, and the body bracket 40 can be unfastened from the vehicle body 16 or the looped first end 26 of the restraint 22 can be slipped over the free upper end of the body bracket 40. Thus, the door 18' ordinarily can be supplied with electrical power and/or control signals when hinged to the body 16, but can nonetheless be easily removed from the vehicle body 16 without damaging the wire routing device 12. Those skilled in the art will recognize that the device 12 can instead or additionally be disconnected from respective portions of the vehicle door 18'.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A wire routing device for use in a vehicle to route at least one wire between a vehicle body and vehicle door movably mounted to the vehicle body, the device comprising:
    an integral, flexible restraint having a first attachment portion at a first end that attaches to the vehicle body and a second attachment portion at a second end that attaches to the vehicle door; and
    a flexible conduit coupled to an exterior surface of the flexible restraint and arranged to carry the at least one wire therethrough.

2. The device of claim 1 wherein the flexible restraint is composed of at least one of nylon or canvas fabric.

3. The device of claim 2 wherein the attachment portions of the flexible restraint include looped ends.

4. The device of claim 3 wherein the looped ends are defined by folding material of the flexible restraint onto itself and sewing the material with a boxed X-stitch.

5. The device of claim 1 wherein the flexible conduit is composed of at least one of nylon or canvas fabric.

6. The device of claim 5 wherein the flexible conduit includes open ends.

7. The device of claim 6 wherein the flexible conduit is constructed from a strip of material folded and closed onto itself to create an open-ended hollow body.

8. The device of claim 7 wherein the flexible conduit is sewed to the flexible restraint.

9. The device of claim 1 wherein the flexible conduit extends beyond the attachment portions of the flexible restraint.

10. The device of claim 1 wherein the flexible restraint limits movement of the door relative to the body.

11. A vehicle, comprising:
a vehicle body;
a vehicle door movably mounted to the vehicle body;
at least one electrical wire extending between the vehicle body and the vehicle door; and
a device secured to the vehicle body and vehicle door to route the at least one electrical wire between the vehicle body and the vehicle door, comprising:
an integral, flexible restraint having a first end that attaches to the vehicle body and a second end that attaches to the vehicle door; and
a flexible conduit coupled to an exterior surface of the flexible restraint and arranged to carry the at least one electrical wire therethrough.

12. The vehicle body of claim 11 wherein the vehicle door is pivotably mounted to the vehicle body.

13. The vehicle body of claim 12 wherein the vehicle door is a passenger door.

14. The vehicle body of claim 11 wherein the one end of the restraint is attached to an interior surface of the vehicle body by a vehicle bracket, and the other end of the restraint is attached to an interior surface of the vehicle door by a door bracket.

15. The vehicle body of claim 14 wherein the brackets are oriented generally vertically.

16. The vehicle body of claim 15 wherein the device is attached to the brackets so that the device projects in a generally horizontal direction into the interior of the vehicle body when the vehicle door is closed with respect to the vehicle body.

17. The vehicle body of claim 11 wherein the vehicle door is removable from the vehicle body after the at least one electrical wire and the device are disconnected from the vehicle body.

18. The vehicle body of claim 14 wherein at least one of the brackets has a free upper end.

19. A wire routing device for use in a vehicle to route at least one wire between a vehicle body and vehicle door movably mounted to the vehicle body, the device comprising:
an integral, flexible restraint having a first attachment portion formed with a first end of the flexible restraint that attaches to the vehicle body and a second attachment portion formed with a second end of the flexible restraint that attaches to the vehicle door; and
a flexible conduit coupled to an exterior surface of the flexible restraint that carries the at least one wire therethrough.

* * * * *